(No Model.) 2 Sheets—Sheet 1.
C. PADMORE & M. A. T. GILLBEE.
CARD GILDING MACHINE.
No. 378,018. Patented Feb. 14, 1888.
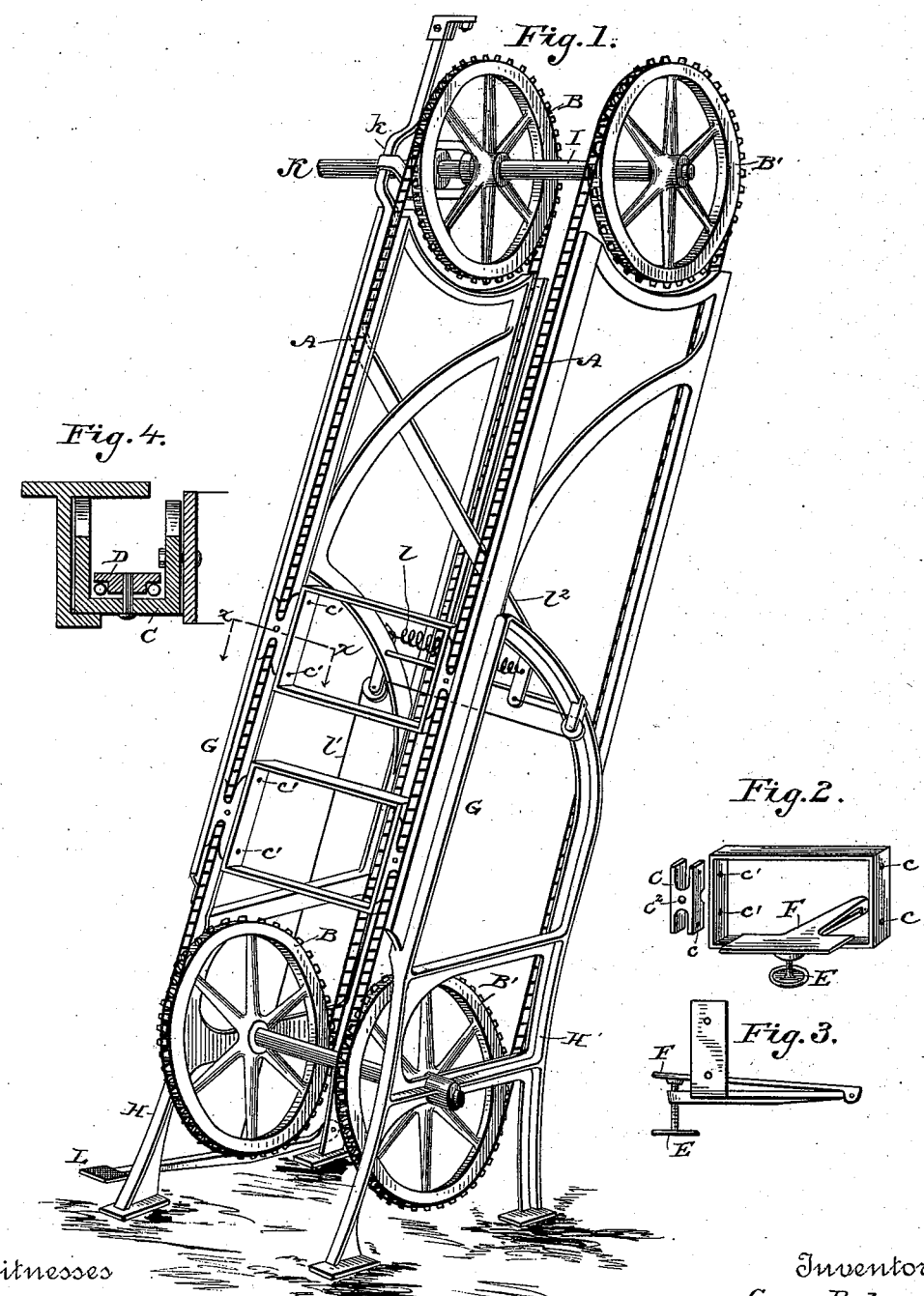
Witnesses
H. W. Elmore
John G. Dickson
Inventors
Casper Padmore
Manuel A. T. Gillbee
By their Attorney
G. J. Harding (No Model.) 2 Sheets—Sheet 2.
C. PADMORE & M. A. T. GILLBEE.
CARD GILDING MACHINE.
No. 378,018. Patented Feb. 14, 1888.
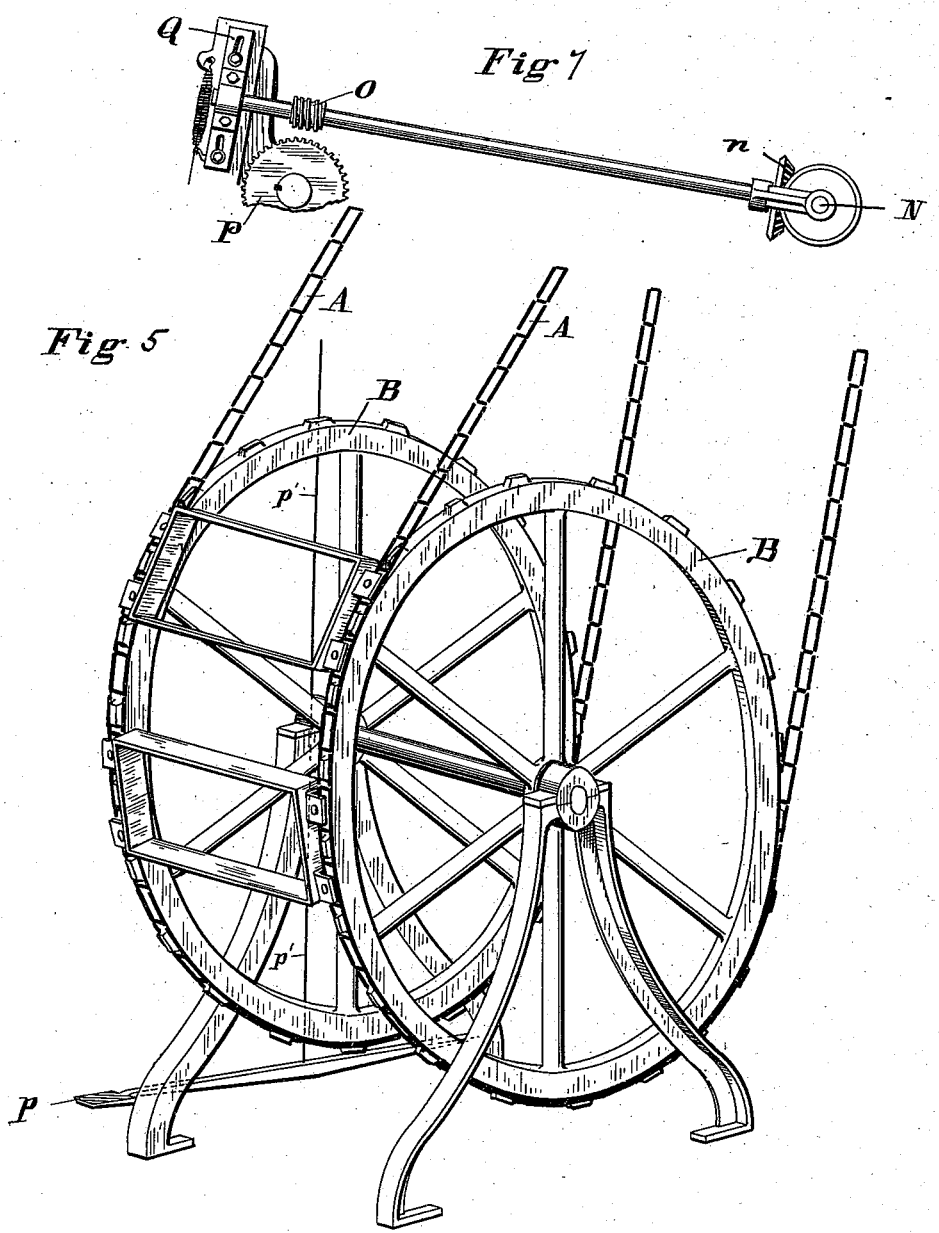
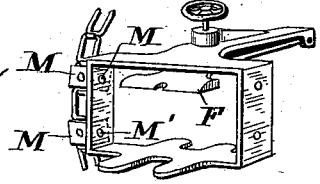

UNITED STATES PATENT OFFICE.

CASPER PADMORE AND MANUEL A. T. GILLBEE, OF PHILADELPHIA, PENNSYLVANIA.

CARD-GILDING MACHINE.

SPECIFICATION forming part of Letters Patent No. 378,018, dated February 14, 1888.

Application filed August 5, 1887. Serial No. 246,241. (No model.)

*To all whom it may concern:*

Be it known that we, CASPER PADMORE and MANUEL A. T. GILLBEE, citizens of the United States, and residents of Philadelphia, Pennsylvania, have invented a new and useful Improvement in Card-Gilding Machines, of which the following is a true and exact description, due reference being had to the drawings which accompany and form a part of this specification, in which similar letters denote similar parts.

Our invention has for its object to provide means by which a large number of series of card-clamps may be brought to the operator who gilds; and our improvement consists in the following:

A carrying-chain, A, of any well-known type, travels over the sprocket-wheels B B B' B', power being transmitted to either the upper or lower set of sprocket-wheels, and a way extends from the lower to the upper sprocket-wheels in which the clamps rest and are prevented, if for any reason they should become detached from the chain, from falling to the floor. To this chain at various points are attached a series of card-clamps, to any desired number. When the desired number of card-clamps, with their complement of cards, have been attached to the chain, the gilding operator takes his position in front of the machine, and upon power being applied to the sprocket-wheels the card-clamps in their order are brought before the operator to be gilded, thus obviating the necessity of bringing the clamps with their cards by hand to the operator.

Referring to the drawings, Figure 1 represents a view of our improvement; Fig. 2, a clamp in which the cards to be gilded are placed; Fig. 3, a section of Fig. 2; Fig. 4, a section of Fig. 1 on line $x\,x$, showing method of attaching clamp to chain; Fig. 5, a modified form of our improvement shown in Fig. 1; Fig. 6, a modified clamp, showing means for attachment of clamp to chain. Fig. 7 shows worm and operating-clutch.

First describing the operation in reference to the form of device shown in Fig. 1, A, as before stated, represents the chain, and B B B' B' the sprocket-wheels. The clamp shown in Fig. 2, which consists of a frame and hinged leaf F, has a wing, C, which is attached to the clamp by rivets or any other means, rivet-holes $c\,c$ being shown in the wing and $c'\,c'$ in the clamp. There are wings on each side of the clamp in the drawing, Fig. 2, the wing being shown on one of the sides, a similar wing being placed on the opposite side. The clamps are attached to the carrying-chains by means of a screw passing through the orifice $c^2$ in the wing and through the opening in the links of the chain, and are secured in place by the wedge D. (Shown in Fig. 4.) These clamps may be attached to the chain so that they may be readily removed therefrom when they pass in front of the operator, in which case the gilding is placed upon the cards off of the carrying-machine, the cards in all cases being stacked in the clamp in the desired manner and held firmly by the screw E and spring-leaf F.

Ways G extend from the lower to the upper sprocket-wheels, in which the wedges D, heretofore described, travel. These ways, if desired, need not be used at all, or may only extend so as to be in the position where the gilding is accomplished, provided said gilding is accomplished without removing the clamps. The ways are sustained by the frame H, and are fastened at their upper end to the shaft of the upper sprocket-wheels, or in any other well-known manner. I, Fig. 1, represents the shaft of the upper sprocket-wheels, and K the main driving-shaft. By means of the clutch $k$ the sprocket-wheels are thrown in or out of gear, and the chain, with its clamps, caused to travel or remain at rest, and this clutch is operated by the operator at will by means of the treadle L, cord $l$, spring $l'$, and lever $l^2$.

In the modification of our device the sprocket-wheels B B of Fig. 1 are increased in diameter sufficiently that the clamps will travel some distance on the periphery of the wheel, and the gilding is accomplished at this point. In order to operate with this modification, it is necessary that the clamps shall be so connected to the chain that in the passage of the chain over the large sprocket-wheel the connections shall accommodate themselves to the curve of the wheel, and this is accomplished by placing upon each side of the clamp two sets of wings, which are angle-irons pivotally joined to the clamp, and these are connected to the chain in the manner heretofore described, and when the chains pass over the large sprocket-wheels (which are the lower wheels) the wings M turn on their pivoted connections M', allowing the chain and clamp to pass readily around.

We also prefer to arrange our power-connection in the manner shown in Fig. 7. In Fig. 7, (shown inverted,) N represents the driving-shaft, having a bevel-gear, $n$, which operates the worm-gear O, and this worm O is thrown in or out of gear with the gear-wheel P on the shaft of the lower sprocket-wheels by means of the treadle $p$, cord $p'$, and slotted carrier Q.

We do not intend to limit ourselves to the particular clamp described and illustrated in the foregoing specification.

Having now fully described our invention, what we claim, and desire to secure by Letters Patent, is—

1. In combination, carrying-chains, sprocket-wheels over which said chains are carried, and one or more card-clamps secured to said carrying-chains.

2. In combination, carrying-chains, sprocket-wheels over which said chains are carried, and one or more card-clamps secured to said carrying-chains, and means to cause one set of sprocket-wheels to revolve.

3. In combination, carrying-chains, sprocket-wheels over which said chains are carried, one or more card-clamps secured to said carrying-chains, means to cause one set of sprocket-wheels to revolve, and ways extending from the lower to the upper sprocket-wheels.

4. In combination, carrying-chains, sets of sprocket-wheels over which said chains are carried, one or more clamps secured to said chains, a main driving-shaft, a shaft connecting the upper sprocket-wheels, a clutch connected with said main driving-shaft, and intermediate mechanism, whereby the sprocket-wheels may be thrown in or out of gear with the driving-shaft.

5. In combination, carrying-chains, sets of sprocket-wheels over which said chains are carried, one or more clamps secured to said chains, a main driving-shaft, a shaft connecting the upper sprocket-wheels, a clutch connected with said main driving-shaft, treadle L, cord $l$, spring $l'$, and lever $l^2$, whereby the sprocket-wheels may be thrown in or out of gear with the driving-shaft.

6. In combination, carrying-chains, sprocket-wheels over which said chains are carried, and one or more card-clamps flexibly connected with said chains.

7. In combination, carrying-chains, sprocket-wheels over which said chains are carried, one or more card-clamps, wings attached to said clamps, and means to attach said wings to said sprocket-chains.

8. In combination, carrying-chains, sprocket-wheels over which said chains are carried, one or more card-clamps, wings attached to said card-clamps, screws passing through said wings, and the chains and wedges, whereby said card-clamps are attached to said sprocket-chains.

9. In combination, carrying-chains, sprocket-wheels over which said chains are carried, one or more card-clamps connected with said chains, and ways extending above the lower sprocket-wheels, and mechanism attached to said clamps which moves in said ways.

10. In combination, carrying-chains, sprocket-wheels over which said chains are carried, ways extending from the lower to the upper sprocket-wheels, one or more card-clamps, wings attached to said card clamps, screws passing through said wings, and the chains and wedges constructed to travel in the ways.

11. In combination, carrying-chains, sprocket-wheels over which said chains are carried, ways extending above the lower sprocket-wheels, one or more card clamps, wings attached to said card-clamps, screws passing through said wings, and the chains and wedges constructed so as to travel in the ways, whereby the card-clamp is attached to the sprocket-chain and guided in the ways.

12. In combination, carrying-chains, sets of sprocket-wheels over which said chains are carried, one or more card-clamps flexibly attached to said chains, the lower set of sprocket-wheels being of sufficient diameter to bring the card-clamps outward in front of the operator, and means to cause said sprocket-wheels to revolve.

13. A card-clamp which consists of a frame, a hinged leaf, and a screw to force said hinged leaf up under the cards, substantially as and for the purpose described.

CASPER PADMORE.
MANUEL A. T. GILLBEE.

Witnesses:
RICHD. S. CHILD, Jr.,
WALTER T. BILYEU.